United States Patent
Wang et al.

(10) Patent No.: US 6,664,358 B2
(45) Date of Patent: Dec. 16, 2003

(54) HIGHLY ALTERNATING ETHYLENE STYRENE INTERPOLYMERS

(75) Inventors: Qinyan Wang, Calgary (CA); Patrick Lam, Calgary (CA); Garry Takashi Yamashita, Calgary (CA)

(73) Assignee: Nova Chemicals (International) S.A. (CH)

( * ) Notice: Subject to any disclaimer, the term of this patent is extended or adjusted under 35 U.S.C. 154(b) by 168 days.

(21) Appl. No.: 09/894,765

(22) Filed: Jun. 28, 2001

(65) Prior Publication Data

US 2003/0013824 A1 Jan. 16, 2003

(51) Int. Cl.$^7$ .......................... C08F 12/04; C08F 12/08
(52) U.S. Cl. ..................... 526/346; 526/347; 526/348; 526/161
(58) Field of Search ................................ 526/346, 347, 526/348, 161

(56) References Cited

U.S. PATENT DOCUMENTS

| | | | |
|---|---|---|---|
| 5,043,408 A | 8/1991 | Kakugo et al. | 526/347 |
| 5,153,157 A | 10/1992 | Hlatky et al. | 502/117 |
| 5,387,568 A | 2/1995 | Ewen et al. | 502/104 |
| 5,703,187 A | 12/1997 | Timmers | 526/282 |
| 6,066,709 A | 5/2000 | Arai et al. | 526/347 |
| 6,191,245 B1 | 2/2001 | Campbell, Jr. et al. | 526/347 |
| 6,235,855 B1 | 5/2001 | Arai et al. | 526/170 |
| 6,239,238 B1 * | 5/2001 | Brown et al. | 526/161 |

OTHER PUBLICATIONS

T. Suzuki, Y. Tsuji, Y. Watanabe, and Y. Takegami, High–Resolution NMR Spectra of Hydrogenated Poly(phenylbutadienes). Styrene–Ethylene Alternating Copolymer and Poly(4–phenyl–1–butene), 1980 American Chemical Society, Marcomolecules 1980, 13, 849–852.

James C. Randall, Polymer Sequence Determination, Statistical Analyses of Monomer Distibutions and Number–Average Sequence Lengths, pp. 71–79.

B. Delmon and J.T. Yates, Catalytic Olefin Polymerization, Studies in Surface Science and Catalysis, vol. 56, pp. 517–529. 1990.

C. Pellecchia, D. Pappalardo, M. D'Arco and A. Zambelli, Alternating Ethylene–Styrene Copolymerization with a Methylaluminoxane–Free Half–Titanocene Catalyst, 1996 American Chemical Society, Macromolecules 1996, pp. 1158–1162.

T. Arai, T. Ohtsu, S, Suzuki, Stereoregular and Bernoullian Copolymerization of styrene and ethylene by bridged metallocene catalysts, Macromole. Rapid Commun. 19, 327–331 (1998).

* cited by examiner

Primary Examiner—Ling-Siu Choi
(74) Attorney, Agent, or Firm—Kennoth H. Johnson

(57) ABSTRACT

Novel ethylene styrene interpolymers having atactic ES repeating units and an alternating structure substantially higher than that predicted using Bernoullian statistics may be prepared in the presence of a transition metal phosphinimine compound and an activator.

8 Claims, 1 Drawing Sheet

Chemical Shift, ppm

HIGHLY ALTERNATING ETHYLENE STYRENE INTERPOLYMERS

FIELD OF THE INVENTION

The present invention relates to interpolymers (including copolymers) of ethylene with one or more $C_{8-20}$ vinyl aromatic monomers, which polymers have a highly alternating structure. That is the polymer has to the extent possible a structure of alternating ethylene and the vinyl aromatic monomers.

BACKGROUND OF THE INVENTION

Polymers of one or more alpha olefins are generally incompatible with polymers of one or more $C_{8-20}$ vinyl aromatic monomers. As a result, it is difficult to blend or even laminate, for example polystyrene and polyethylene. There have been a number of attempts to prepare copolymers of, for example styrene and ethylene. Such polymers could lead to two different developments. The copolymer might have the properties sought after in the blend or the copolymer may be a suitable compatibilizer so that the blend could be prepared.

U.S. Pat. No. 6,066,709 issued May 23, 2000 assigned to Denki Kagaku Kogyo Kabushiki Kaisha discloses an ethylene styrene copolymer having from 1 to 55 mole % of an isotactic ES structure having a head to tail bond structure (e.g. ESSE). The polymers of the present invention have $^{13}C$ NMR peaks at 25.7 indicating an atactic structure rather than isotactic structure.

U.S. Pat. No. 6,191,245 issued Feb. 20, 2001 to Campbell et al., assigned to the Dow Chemical Company teaches copolymers of one or more alpha olefins and one or more vinyl aromatic monomers which are substantially random (Col. 6 lines 45–48). The polymers of the present invention have a significantly higher degree of alternating structure than that predicted by Bernoullian statistical modeling. The ratio of the amount of triads having the sequence vinyl aromatic monomer, ethylene, vinyl aromatic monomer divided by the calculated amount of triads having the same sequence as determined by Bernoullian statistical modeling is from greater than 1.5 to 9.5.

U.S. Pat. No. 5,703,187 issued Dec. 30, 1997, assigned to the Dow Chemical Company teaches pseudo random co-polymers of styrene and ethylene. The specification teaches a particular distinguishing feature of pseudo random copolymers is that all the phenyl groups substituted on the polymer backbone are separated by 2 or more methylene units. No styrene was inserted in a head to tail manner. The polymers of the Dow patent do not have the high degree of alternating nature of the polymers of the present invention. Additionally, the process for preparing such polymers uses a catalyst distinct from that disclosed in the reference.

U.S. Pat. No. 6,191,245 B1 filed by the Dow Chemical Company claims a substantially random structure of an ethylene styrene copolymer with a head to tail insertion. The reference teaches that the styrene in the styrene ethylene tetrad (ESSE) is inserted exclusively in the head to tail manner. The patent teaches away from ES in an alternating structure.

There are a number of Idemitsu Kosan Co. Ltd. patents which teach polymers comprising blocks of syndiotactic polystyrene (the phenyl rings are alternating on opposite sides of the back bone) and the olefin is incorporated in repeating units (e.g. olefin blocks). The patent teaches blocks of syndiotactic polystyrene and does not suggest ES in an alternating structure. Additionally, the process for preparing the block copolymers does not use the catalyst system contemplated by the present invention.

U.S. Pat. No. 5,043,408 issued Aug. 27, 1991 teaches an ethylene styrene copolymer having alternating ES units. However, the polymer has an isotactic diad of the ES repeating units of not less than 0.55 (i.e. greater than 0.55). The polymers of the present invention are essentially atactic ES having head to tail and tail to tail SS microstructure.

U.S. Pat. No. 6,235,855 issued May 22, 2001 teaches an ES polymer having isotactic styrene blocks. The alternating polymer of the present invention contains not more than two styrene monomers in a row and consequently does not contain polystyrene blocks.

The present invention seeks to provide a highly alternating polymer comprising ethylene and one or more vinyl aromatic monomers in which, in the triad sequence of vinyl aromatic monomer and ethylene as determined by $^{13}C$ NMR, the triads have the sequence vinyl aromatic monomer, ethylene, vinyl aromatic monomer and the ratio of the amount of triads having the sequence vinyl aromatic monomer, ethylene, vinyl aromatic monomer divided by the calculated amount of triads having the same sequence, as determined by Bernoullian statistical modeling, is from greater than 1.5 to 9.5.

SUMMARY OF THE INVENTION

The present invention provides a highly alternating interpolymer consisting of from 20 to 70 weight % of ethylene and from 80 to 30 weight % a $C_{8-20}$ vinyl aromatic monomer wherein:

(i) in the triad sequence of vinyl aromatic monomer and ethylene as determined by $^{13}C$ NMR, the triads have the sequence vinyl aromatic monomer, ethylene, vinyl aromatic monomer and the ratio of the amount of triads having the sequence vinyl aromatic monomer, ethylene, vinyl aromatic monomer divided by the calculated amount of triads having the same sequence as determined by Bernoullian statistical modeling is from greater than 1.5 to 9.5;

(ii) said polymer has ES repeating units essentially in an atactic configuration;

(iii) the maximum number of sequential vinyl aromatic monomer units in sequence does not exceed 2; and (iv) said polymer containing ES repeating unit, having head to tail and tail to tail SS microstructure present.

The present invention further provides a process for preparing the above highly alternating interpolymer, comprising contacting a monomer mixture comprising from 70 to 30 weight % of a $C_{8-20}$ vinyl aromatic monomer and from 30 to 70 weight % of ethylene with a catalyst comprising a phosphinimine compound of the formula:

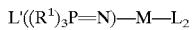

$$L'((R^1)_3P=N)-M-L_2$$

wherein each $R^1$ is independently selected from the group consisting of $C_{3-6}$ alkyl radicals, M is selected from the group consisting of Ti, Zr and Hf, and each L is independently selected from the group consisting of a halogen atom, a hydrogen atom, a $C_{1-10}$ alkyl radical, a $C_{1-10}$ alkoxide radical, and a $C_{6-10}$ aryl oxide radical, L' is an anionic ligand having up to 50 C, H, O, N, Si and P atoms and at least one activator selected from the group consisting of:

(i) a mixture comprising complex aluminum compound of the formula $R^2{}_2AlO(R^2AlO)_mAlR^2{}_2$ wherein each $R^2$ is independently selected from the group consisting of $C_{1-20}$ hydrocarbyl radicals and m is from 3 to 50, and a hindered phenol to provide a molar ratio of Al:hindered phenol from 2:1 to 5:1; and (ii) ionic activators selected from the group consisting of:
(A) compounds of the formula $[R^3]^+[B(R^4)_4]^-$ wherein B is a boron atom, $R^3$ is a cyclic $C_{5-7}$ aromatic cation or a triphenyl methyl cation and each $R^4$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^5)_3$; wherein each $R^5$ is independently selected from the group consisting of a hydrogen atom and a $C_{1-4}$ alkyl radical; and
(B) compounds of the formula $[(R^8)_tZH]^+[B(R^4)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and
(C) compounds of the formula $B(R^4)_3$ wherein $R^4$ is as defined above;
(iii) mixtures of (i) and (ii);

in an inert hydrocarbyl medium at a temperature from 20° C. to 150° C. and a pressure from 15 psi (103 KPa) to 600 psi (4,137 KPa).

DETAILED DESCRIPTION

Figure 1:
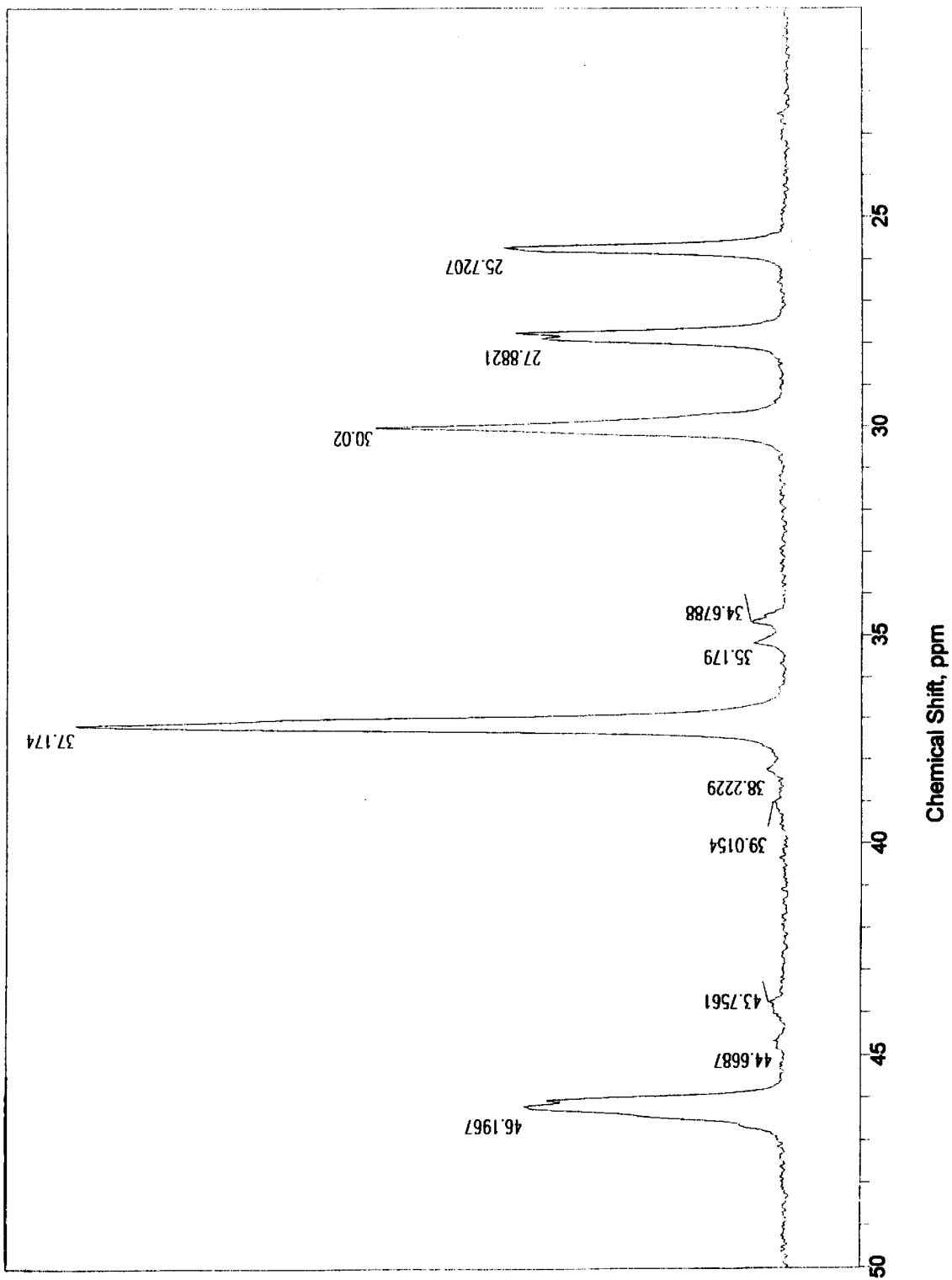
FIG. 1 is a $^{13}$C NMR spectrum of the ethylene styrene interpolymer produced according to Example 1 after MEK extraction.

For the purposes of this specification a $^{13}$C NMR peak means a signal that is at least three times the peak to peak noise.

The present invention relates to highly alternating polymers of ethylene and one or more $C_{8-20}$, preferably $C_{8-12}$, vinyl aromatic monomers which are unsubstituted or substituted by a $C_{1-4}$ alkyl radical. The vinyl aromatic monomer may be selected from the group consisting of styrene, alpha methyl styrene and p-methyl styrene. Preferably, the vinyl aromatic monomer is styrene.

The polymers of the present invention generally comprise from 20 to 70, preferably from 30 to 70, most preferably from 30 to 60 weight % of ethylene and from 80 to 30, preferably from 70 to 30, most preferably from 70 to 40 weight % of vinyl aromatic monomer. The polymers of the present invention generally do not contain a $^{13}$C NMR peak at a shift (relative to TMS) of about 40.8 to 41.0 ppm (syndiotactic) or 40.5 to 41.0 ppm (atactic blocks). Carbon-13 NMR spectra of the polymers do not have a peak near 40 to 41 ppm indicating no isotactic configuration. The $^{13}$C NMR spectra also have small peaks at about 34 to 34.5 ppm and 34.5 to 35.2 ppm, generally attributed to pseudo block portions (styrene tail to tail insertion) of the polymer.

Triad sequence distributions were determined from methine or methylene resonances for ESE, SES, SEE and EEE triads located at 46.5 ppm, 25.7 ppm, 27.9 ppm and 30.0 ppm respectively. Styrene-styrene inversions were determined from the methylene resonances observed between 34 and 36 ppm. Peak areas were used to calculate the normalized triads per 1000 backbone carbons according to the formula below.

[triad]=(A1/n1)×1000/A[backbone]

where A1 is the peak area for the resonance representing the triad, n1 is the number of carbons per unit triad contributing to the peak area, A1, and A[backbone] represents the sum of the areas for peaks attributable to the main chain carbon backbone.

SES from Bernoullian statistical modeling is calculated as described by J. C. Randall in *POLYMER SEQUENCE DETERMINATION, CARBON-13 NMR METHOD*, Academic Press New York, 1977, pp 71–78.

Tacticity of ethylene-styrene repeating unit was determined by the Sββ resonance of ethylene-styrene alternating sequences appearing at about 25 ppm. The meso and racemic diads of this sequence have previously been described in the literature. (Suzuki, T.; Tsuji, Y.; Watanabe, Y.; Takegami, T. *Macromolecules*, 13, 849 (1980); Kakugo M.; Miyatake, T.; Mizunuma, K. *Studies in Surface Science and Catalysis*, 56, 517 Kodansha Ltd (Tokyo)/Elsevier (Amsterdam) 1990; Pellecchia, C; Pappalardo, D; D'Arco, M.; Zambelli, A. *Macromolecules*, 29, 1158–1162 (1996); Arai, T; Ohtsu, T.; Suzuki, S. *Macromol. Rapid Commun*, 19, 327–331 (1998); and U.S. Pat. No. 6,066,709.

GRAMS/32 software (Galactic Industries) was used to curvefit this resonance to obtain the relative areas for the meso and racemic diads. Within experimental error, we obtained equal amounts of m and r diads, confirming the atactic structure of ethylene and styrene repeating unit.

In the polymers of the present invention, preferably the ratio of the amount of triads having the sequence vinyl aromatic monomer, ethylene, vinyl aromatic monomer divided by the calculated amount of triads having the same sequence as determined by Bernoullian statistical modeling is greater than 1.5 to 9.5, preferably from 6 to 9.5, most preferably from 6.5 to 8.5. Preferably, not less than 57%, most preferably not less than 55% of the ethylene and vinyl aromatic monomer available to form triads, form triads having the sequence vinyl aromatic monomer, ethylene, vinyl aromatic monomer and less than 10% of the monomer available, form vinyl aromatic monomer diads.

The polymers of the present invention may be prepared by solution or slurry polymerization of the monomers in the presence of a catalyst comprising a phosphinimine compound of the formula:

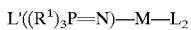

L'((R$^1$)$_3$P=N)—M—L$_2$ wherein each $R^1$ is independently selected from the group consisting of $C_{3-6}$ alkyl radicals, M is selected from the group consisting of Ti, Zr and Hf, and each L is independently selected from the group consisting of a halogen atom, a hydrogen atom, a $C_{1-10}$ alkyl radical, a $C_{1-10}$ alkoxide radical, and a $C_{6-10}$ aryl oxide radical, L' is an anionic ligand having up to 50 C, H, O, N, Si and P atoms and at least one activator selected from the group consisting of:
(i) a mixture comprising complex aluminum compound of the formula $R^2{}_2AlO(R^2AlO)_mAlR^2{}_2$ wherein each $R^2$ is independently selected from the group consisting of $C_{1-20}$ hydrocarbyl radicals and m is from 3 to 50, and a hindered phenol to provide a molar ratio of Al:hindered phenol from 2:1 to 5:1; and
(ii) ionic activators selected from the group consisting of:
(A) compounds of the formula $[R^3]^+[B(R^4)_4]^-$ wherein B is a boron atom, $R^3$ is a cyclic $C_{5-7}$ aromatic cation or a triphenyl methyl cation and each $R^4$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^5)_3$; wherein each $R^5$ is independently selected from the group consisting of a hydrogen atom and a $C_{1-4}$ alkyl radical; and (B) compounds of the formula $[(R^8)_tZH]^+[B(R^4)_4]^-$ wherein B is a boron atom, H is a hydrogen atom, Z is a nitrogen atom or phosphorus atom, t is 2 or 3, and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^4$ is as defined above; and (C) compounds of the formula $B(R^4)_3$ wherein $R^4$ is as defined above; and (iii) mixtures of (i) and (ii);

in an inert hydrocarbyl medium at a temperature from −40° C. to 160° C., preferably from 20° C. to 150° C. and a pressure from 15 psi to 15,000 psi, preferably from 15 psi to 600 psi. The polymerization may take place at temperatures from about 20° C. to about 150° C., most preferably from about 60° C. to about 120° C. and at pressures from about 15 psi (103 KPa) up to about 600 psi (4,137 KPa), most preferably from about 100 psi (689 KPa) to 600 psi.

The polymerization may be conducted in the presence of an inert solvent or diluent. Suitable solvents or diluents are hydrocarbons having from about 5 to 12 carbon atoms or mixtures thereof. These compounds include pentane, hexane, heptane, octane, cyclohexane, methylcyclohexane, benzene, toluene, and hydrogenated naphtha. A commercially available hydrocarbon is ISOPAR® E (a $C_{5-12}$ aliphatic solvent sold by EXXON Chemical Co.).

In the phosphinimine complex preferably, wherein $R^1$ is a $C_{3-5}$ branched alkyl radical (e.g. isopropyl, isobutyl, t-butyl, etc.), L is selected from the group consisting of a hydrogen atom, a chlorine atom and a $C_{1-4}$ alkyl radical, L' is a phosphinimine, siloxy, amide and M is Ti. If L' is a phosphinimine ligand it may be the same or different from the phosphinimine ligand already in the complex. Suitable siloxy ligands include tri-$C_{1-6}$ alkyl siloxy ligands, preferably the alkyl substituent has from 3 to 5 carbons atoms and may be branched or straight chained, most preferably branched. Suitable amide ligands are dialkyl amides containing up to 12 carbon atoms in which the alkyl substituents may be joined to (or taken together) form a ring which is unsubstituted or further substituted by up to 3 $C_{1-3}$ alkyl radicals. A suitable amide ligand is 2,2,6,6-tetra methyl piperidinyl.

In the aluminum compound, preferably $R^2$ is a methyl radical and m is from 10 to 40. The preferred molar ratio of Al:hindered phenol is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethyl-phenol.

The "ionic activator" may abstract one or more activatable ligands so as to ionize the catalyst center into a cation, but not to covalently bond with the catalyst and to provide sufficient distance between the catalyst and the ionizing activator to permit a polymerizable olefin to enter the resulting active site.

Examples of ionic activators include:

triethylammonium tetra(phenyl)boron, tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
tropillium tetrakis (2,3,4,5-tetrafluorophenyl) borate, and
triphenylmethylium tetrakis (2,3,4,5-tetrafluorophenyl) borate.

Readily commercially available ionic activators include:
N,N-dimethylaniliniumtetrakispentafluorophenyl borate;
triphenylmethylium tetrakispentafluorophenyl borate (tritylborate); and
trispentafluorophenyl borane.

The aluminum compounds (alumoxanes) are typically used in substantial molar excess compared to the amount of metal in the catalyst. Aluminum:transition metal molar ratios of from 10:1 to 10,000:1 are preferred, especially from 50:1 to 500:1.

Another type of activator is the "ionic activator" or "substantially non-coordinating anion". As used herein, the term substantially non-coordinating anions ("SNCA") are well known cocatalyst or activator systems which are described, for example, in U.S. Pat. No. 5,153,157 (Hlatky and Turner), and the carbonium, sulfonium and oxonium analogues of such activators which are disclosed by Ewen in U.S. Pat. No. 5,387,568. In general, these SNCA form an anion which only weakly coordinates to a cationic form of the catalyst.

While not wanting to be bound by theory, it is generally believed that SNCA-type activators ionize the catalyst by abstraction or protonation of one of the "X" ligands (non-interfering ligands) so as to ionize the group 4 metal center into a cation (but not to covalently bond with the group 4 metal) and to provide sufficient distance between the ionized group 4 metal and the activator to permit a polymerizable olefin to enter the resulting active site. It will be appreciated by those skilled in the art that it is preferable that the "non-interfering" ("X") ligands be simple alkyls when using a SNCA as the activator. This may be achieved by the alkylation of a halide form of the catalyst.

If the phosphinimine compound is activated only with the ionic activator the molar ratio of transition metal to boron will be from 1:1 to 1:3 preferably from 1:1.05 to 1:1.20.

In a preferred embodiment of the present invention the catalyst is a combination of a phosphinimine compound, an aluminum compound with a hindered phenol and an ionic activator. Generally such a catalyst system has a molar ratio of transition metal (e.g. Ti):Al:boron from 1:20:1 to 1:120:3, preferably 1:20:1 to 1:45:1.5, most preferably from 1:38:1 to 1:42:1.5.

The resulting polymer is then recovered and separated from the solvent and then devolatilized using conventional techniques.

The resulting polymer typically will have a molecular weight (weight average Mw) from about 100,000 to about 400,000. The polymer may be compounded with conventional heat and light stabilizers (antioxidants) and UV stabilizers in conventional amounts. Typically the antioxidant may comprise a hindered phenol and a secondary antioxidant, generally in a weight ratio of about 0.5:1 to 5:1 and the total amount of antioxidant may be from 200 to 3,000 ppm. Generally, the UV stabilizer may be used in amounts from 100 to 1,000 ppm.

The present invention will now be illustrated by the following non-limiting examples in which unless otherwise specified parts means parts by weight (e.g. grams) and % means weight percent.

The ethylene and styrene polymerization reactions were performed in a 2 L Parr reactor. All the chemicals (solvent, comonomers, catalyst and scavenger) were fed into the reactor batchwise except ethylene, which was fed on demand. The ethylene was controlled using a Hasting mass flow controller set at a maximum rate of 10 slpm (standard liter per minute). As are known to those skilled in the art, all the feed streams were purified prior to feeding into the reactor by contact with various absorption media to remove catalyst-killing impurities such as water, oxygen, sulfur and polar materials. A purification column packed with DD-2 alumina from Alcoa was used to remove the inhibitor in styrene. Passing the styrene through the column was found to reduce the catechol concentration to less than 1 ppm and the moisture to ~10 ppm. All reaction components were stored and manipulated under an atmosphere of purified nitrogen or argon. Purified hexane was used as the solvent for the reaction. The reaction was monitored using the Labtech Notebook software. Temperature control was achieved through the use of an automated temperature control system.

PMAO-IP was purchased from Akzo-Nobel with 12.7 weight % of aluminum. $[CPh_3][B(C_6F_5)_4]$ was purchased from Asahi Glass Inc.; lot #: 980224. Hexane was purchased from Aldrich as HPLC grade and purified by contact with various absorption media. Toluene was purchased from Aldrich and purified by passing through various absorption media. Toluene was used as a dilution solvent for catalyst/cocatalyst. Styrene was obtained from NOVA Chemical's internal styrene plant with about 15 ppm of t-butyl catechol. 5-ethylidene-2-norbornene (ENB) was purchased from Aldrich and distilled over $CaH_2$ and stored over molecular sieves at −35° C. 1-octene was purified by contact with various absorption media. Hydrogen and ethylene were purchased from Praxair as UHP and polymer grade, respectively. $(NPtBu_3)_2TiCl_2/(NPtBu_3)_2TiMe_2$ was prepared according to the procedure disclosed in the WO 00005238 A1 (U.S. Pat. No. 6,239,238). MAO solution: PMAO-IP and 2,6-di-t-butyl-4 ethyl-phenol were dissolved in toluene with Al/phenol=3.25.

The polymerization temperatures for styrene and ethylene reactions were set at 90° C. 500 ml of styrene was added into the reactor as a batch. The total reaction pressure was 100 psig at 90° C. 400 ml of hexane was used as reaction diluent. The reaction time was 60 minutes or until the ethylene consumption reached 60 L. The reactions were terminated by adding 5 ml of methanol. The polymer solution was collected in a stainless steel bowl and was treated in a water bath at 100° C. to remove unreacted styrene and solvent. The ES polymers were then dried in a vacuum oven for at least 4 hours at about 80° C. Polymerization activities were calculated based on the weight of the polymer produced, the concentration of catalyst and the duration of reaction.

ES methyl ethyl ketone (MEK) soluble and insoluble fractions determination: 1 g of ES copolymer was dissolved in 15 ml of toluene at room temperature overnight. The solution was heated to 100° C. for 1–2 hours, then cooled to 60° C. 300 ml of MEK was added. The solution was cooled to −74° C. overnight. MEK soluble and insoluble fractions were then separated and collected for further analysis.

FT-IR analysis was conducted using a Nicolet Model 750 Magna IR spectrometer.

$I_2$ was measured with 2.16 kg at 190° C. using a Tinius Olsen MP993.

Polymers were analyzed by $^{13}C$ NMR spectroscopy at 125° C. using a Bruker DPX300 spectrometer operating at 75.47 MHz. All samples were MEK insoluble fractions and were prepared at 5–15 weight % in 10 mm NMR tubes using 1,1,2,2-tetrachloroethane-d2 as the lock solvent. The spectrometer was operated using the following parameters: spectral width, 15,000 Hz; pulse width, 90°; acquisition time, 2.72 seconds; delay, 7.28 seconds; decoupling, bilevel composite pulse decoupling; file size, 64K data points; line broadening, 1–2 Hz; number of scans, 8000.

Chemical shifts are based on the isolated methylene backbone resonance occurring at 30.0 ppm versus TMS. This was achieved by referencing the central peak of the 1,1,2,2-tetrachloroethane-d2 to 74.4 ppm. Distortionless Enhanced Polarization Transfer (DEPT) experiments were performed using a standard DEPT-135 pulse sequence. All methyl and methine carbons appeared as positive peaks while the methylene carbons generated negative peaks.

Preparation of Ethylene and Styrene Interpolymers

EXAMPLE 1

Polymerization was carried out by using a 2L Parr reactor equipped with a stirrer and a jacket for heating/cooling. 400 ml of dry hexane and 500 ml of dry styrene were charged along with 27 mmol of MAO solution into the reactor. The inner temperature was raised to 90° C. with stirring. Ethylene was introduced to maintain 100 psig during the polymerization reaction. About 4 ml of a toluene solution containing a mixture of $(NPtBU_3)_2TiMe_2$ (58.5 umol), $[CPh_3][B(C_6F_5)_4]$ (87.8 umol) and MAO solution (1.17 mmol of Al) was added to the reactor from a catalyst tank installed above the reactor. The temperature increased to over 100° C. initially and was brought back to 90° C. within 5 minutes by the cooling system. Polymerization was carried out for 1 hour. After the polymerization, 5 ml of methanol was injected into the reactor to stop the reaction. The obtained polymer solution was treated in a water bath to remove unreacted styrene and solvent. 500 ppm of antioxidant (Irganox-1076) was added. Polymer was dried under reduced pressure at 80° C. until no weight change was observed.

EXAMPLE 2

Polymerization and post treatment were carried out in the same manner as in Example 1 under the conditions shown in Table1. This is a repeating experiment with half of the catalyst concentration.

EXAMPLE 3

Polymerization and post treatment were carried out in the same manner as in Example 1 under the conditions shown in Table1, except Δ5 psig of $H_2$ was introduced through a 150 ml shot tank at 200 psig of $H_2$.

EXAMPLES 4 AND 5

Polymerization and post treatment were carried out in the same manner as in Example 1 under the conditions and catalyst system shown in Table1.

EXAMPLE 6

Polymerization and post treatment were carried out in the same manner as in Example 1 under the conditions and catalyst system shown in Table1, except 10 ml of ENB was added to the reactor.

COMPARATIVE EXAMPLE 7

Polymerization and post treatment were carried out in the same manner as in Example 1 under the conditions and catalyst system shown in Table1.

TABLE 1

| Ex. # | Catalyst/Cocatalyst | Amount of Catalyst (umol/L) | Yield (g) | Activity g Polymer/ mmolCat*hr |
|---|---|---|---|---|
| 1 | $(NPtBu_3)_2TiMe_2$/Tritylborate | 65 | 104 | 1753 |
| 2 | $(NPtBu_3)_2TiMe_2$/Tritylborate | 32 | 66 | 2369 |
| 3 | $(NPtBu_3)_2TiMe_2$/Tritylborate[1] | 74 | 107 | 1571 |
| 4 | $(NPtBu_3)_2TiCl_2$/MAO Solution[2] | 100 | 194 | 2089 |
| 5 | $(NPtBu_3)_2TiCl_2$/MAO Solution/Tritylborate[3] | 100 | 110 | 2437 |
| 6 | $(NPtBu_3)_2TiCl_2$/MAO Solution[4] | 50 | 46 | 1000 |
| 7 | Dow—CGC—$Me_2$ + PMAO—IP/$B(C_6F_5)_3$[5] | 65 | 147 | 2418 |

Note:
Catalyst/cocatalyst and MAO solutions were premixed in catalyst injection bomb with Al/B/Ti = 20/1.05/1.
Polymerization temperature is 90° C. and reaction run was for 1 hour. 30 mmol/L of MAO solution was used as a scavenger.
MAO solution was also used as the activator.
Polymerization initial rates were high and there was no temperature control in the first 5 minutes of the polymerization reaction.
[1]Δ5 psig of $H_2$ was used.
[2]Al/Ti = 300
[3]Al/B/Ti = 40/1.05/1
[4]Al/Ti = 300. 10 ml of ENB was added.
[5]5 mmol/L of PMAO-IP as a scavenger.

TABLE 2

| Ex. # | St Content (wt %) | $[SES]_E$/$[SES]_B$ | $I_2$ (g/10 min) | MEK Soluble (wt %) |
|---|---|---|---|---|
| 1 | 66 | 8.3 | 0.4 | 17 |
| 2 | 67 | 7.2 | 1.9 | 15 |
| 3 | 69 | — | 20.7 | — |
| 4 | 72 | 7.4 | 36.1 | 48 |
| 5 | 69 | 7.1 | 1.1 | 11 |
| 6 | 73 | 6.8 | 0.7 | 17 |
| 7 | 57 | 4.9 | 4.2 | 16 |

Note:
In example 6, ENB content is 3.5 wt %.
$[SES]_E$ = Experimental
$[SES]_B$ = Bernoullian

What is claimed is:

1. A highly alternating interpolymer consisting of from 20 to 70 weight % of ethylene and from 80 to 30 weight % of a $C_{8-20}$ vinyl aromatic monomer wherein:

(i) in the triad sequence of vinyl aromatic monomer and ethylene as determined by $^{13}C$ NMR, the triads have the sequence vinyl aromatic monomer, ethylene, vinyl aromatic monomer and the ratio of the amount of triads having the sequence vinyl aromatic monomer, ethylene, vinyl aromatic monomer divided by the calculated amount of triads having the same sequence as determined by Bernoullian statistical modeling is from greater than 1.5 to 9.5;

(ii) said polymer has ethylene vinyl aromatic monomer repeating units essentially in an atactic configuration;

(iii) the maximum number of sequential vinyl aromatic monomer units in sequence does not exceed 2; and (iv) said polymer containing ethylene vinyl aromatic monomer repeating unit, having head to tail and tail to tail microstructure present.

2. The highly alternating interpolymer according to claim 1, wherein the vinyl aromatic monomer is a $C_{8-12}$ vinyl aromatic monomer.

3. The highly alternating interpolymer according to claim 2, wherein the $C_{8-12}$ vinyl aromatic monomer is selected from the group consisting of styrene, alpha methyl styrene and para-methyl styrene.

4. The highly alternating interpolymer according to claim 3, wherein the ratio of the amount of triads having the sequence vinyl aromatic monomer, ethylene, vinyl aromatic monomer divided by the calculated amount of triads having the same sequence as determined by Bernoullian statistical modeling is from 6 to 9.5.

5. The highly alternating interpolymer according to claim 4, wherein not less than 57% of the ethylene and vinyl aromatic monomer available to form triads, form triads having the sequence vinyl aromatic monomer, ethylene, vinyl aromatic monomer and less than 10% of the monomer available form vinyl aromatic monomer diads.

6. The highly alternating interpolymer according to claim 5, wherein the vinyl aromatic monomer is present in an amount from 40 to 70 weight % of the polymer.

7. The highly alternating interpolymer according to claim 6, wherein the vinyl aromatic monomer is styrene.

8. The highly alternating interpolymer according to claim 7, having a $^{13}C$ NMR spectrum according to FIG. 1.

* * * * *